United States Patent
Moakes

(10) Patent No.: US 12,403,366 B1
(45) Date of Patent: *Sep. 2, 2025

(54) REACTIVE GAME PLAY

(71) Applicant: Topgolf International, Inc., Dallas, TX (US)

(72) Inventor: Scott Moakes, Dallas, TX (US)

(73) Assignee: Topgolf International, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/018,074

(22) Filed: Jan. 13, 2025

Related U.S. Application Data

(63) Continuation of application No. 18/935,203, filed on Nov. 1, 2024, now Pat. No. 12,246,231.

(60) Provisional application No. 63/603,022, filed on Nov. 27, 2023.

(51) Int. Cl.
- A63B 67/02 (2006.01)
- A63B 24/00 (2006.01)
- A63B 69/36 (2006.01)
- A63B 71/06 (2006.01)

(52) U.S. Cl.
CPC .......... *A63B 67/02* (2013.01); *A63B 24/0021* (2013.01); *A63B 69/3694* (2013.01); *A63B 71/0622* (2013.01); A63B 2024/0034 (2013.01); A63B 2024/0096 (2013.01); A63B 71/0669 (2013.01); A63B 2220/807 (2013.01); A63B 2220/833 (2013.01); A63B 2220/89 (2013.01)

(58) Field of Classification Search
CPC . A63B 67/02; A63B 24/0021; A63B 69/3694; A63B 71/0622; A63B 71/0669; A63B 2024/0034; A63B 2024/0096; A63B 2220/807; A63B 2220/833; A63B 2220/89
USPC ............................................. 473/134
See application file for complete search history.

(56) References Cited

U.S. PATENT DOCUMENTS

| | | |
|---|---|---|
| 6,308,160 B1 | 10/2001 | Rex |
| 7,056,221 B2 | 6/2006 | Thirkettle |
| 7,160,196 B2 | 1/2007 | Thirkettle et al. |
| 7,337,965 B2 | 3/2008 | Thirkettle et al. |
| 7,636,669 B1 | 12/2009 | Bergert |
| 7,806,777 B2 | 10/2010 | Cheng |
| 7,847,808 B2 | 12/2010 | Cheng et al. |
| 8,077,917 B2 | 12/2011 | Forsgren |
| 8,270,995 B1 | 9/2012 | Manroa et al. |
| 10,596,416 B2 | 3/2020 | Forsgren |
| 10,695,646 B2 | 6/2020 | Marten |
| 10,898,757 B1 | 1/2021 | Johansson et al. |
| 11,024,079 B1 * | 6/2021 | Chuah ............ G06T 7/246 |
| 11,335,013 B2 | 5/2022 | Forsgren et al. |
| 11,409,411 B1 | 8/2022 | Levin |
| 11,504,582 B2 | 11/2022 | Johansson et al. |
| 11,513,208 B2 | 11/2022 | Eriksson |
| 11,557,044 B2 | 1/2023 | Forsgren et al. |
| 11,644,562 B2 | 5/2023 | Hugmark et al. |

(Continued)

*Primary Examiner* — Michael A Cuff
(74) *Attorney, Agent, or Firm* — Michael A Catania

(57) ABSTRACT

A method and system for playing a player reactive game at a golf entertainment venue are disclosed herein. The system includes golf ball tracking sensors, hitting bays and a server. The golf ball tracking sensors are positioned at a golf driving range. The hitting bays are also at the golf driving range, and each hitting bay has a video display. The server is configured to modify gameplay based on the shot types detected.

20 Claims, 17 Drawing Sheets

(56) References Cited

U.S. PATENT DOCUMENTS

| | | |
|---|---|---|
| 11,995,846 B2 | 5/2024 | Forsgren et al. |
| 12,105,184 B2 | 10/2024 | Eriksson |
| 12,121,771 B2 | 10/2024 | Hugmark et al. |
| 12,128,275 B2 | 10/2024 | Forsgren |
| 2001/0037225 A1 | 11/2001 | Last |
| 2002/0183872 A1 | 12/2002 | Matsumoto et al. |
| 2009/0094072 A1 | 4/2009 | Rodenberg |
| 2009/0210263 A1 | 8/2009 | Smeenge et al. |
| 2011/0202376 A1 | 8/2011 | Rodenberg |
| 2011/0307392 A1 | 12/2011 | Jenson |
| 2015/0196822 A1 | 7/2015 | Voutiliainen et al. |
| 2016/0136502 A1 | 5/2016 | Voutiliainen |
| 2016/0354671 A1 | 12/2016 | Nuesmeyer et al. |
| 2016/0361617 A1 | 12/2016 | Luciano, Jr. et al. |
| 2017/0109660 A1 | 4/2017 | Takuma |
| 2017/0116548 A1 | 4/2017 | Ito et al. |
| 2019/0303983 A1 | 10/2019 | Vollbrecht et al. |
| 2020/0108302 A1 | 4/2020 | Marten |
| 2020/0391077 A1 | 12/2020 | Forsgren |
| 2021/0236904 A1 | 8/2021 | Korpach |
| 2022/0040534 A1 | 2/2022 | Imes |
| 2022/0203178 A1 | 6/2022 | Burdette et al. |
| 2022/0285036 A1* | 9/2022 | Merjanian ............... G16H 50/80 |
| 2022/0288479 A1 | 9/2022 | Won |
| 2022/0387873 A1* | 12/2022 | Hall ................... A63B 24/0021 |
| 2023/0124155 A1 | 4/2023 | Ines |
| 2023/0196214 A1 | 6/2023 | Cordero et al. |
| 2023/0316754 A1* | 10/2023 | Gintautas ............... G06V 20/46 |
| | | 382/103 |
| 2024/0005559 A1* | 1/2024 | Hainline ................. G06T 9/001 |

\* cited by examiner

100

| Shot | Launch Angle Y (Degrees) | Launch Angle X | Carry | Height | Speed | Curve | Roll | End Position |
|---|---|---|---|---|---|---|---|---|
| Drive | 10-15 | 0-2 | High | Mid/High | | None | Low | |
| Stinger | 5-10 | 0-1 | High | Low | | None | Low | |
| Chip | 25-40 | 0-1 | Low | Mid | | Low | High | |
| Pitch | 40-55 | 0-1 | Low | High | | Low | Low | |
| Putt | 0 | 0-2 | Low | Low | | Low | | In target |
| Bunker | | | | | | | | In bunker |

| Shot | Effect | Scoring | Superlative |
|---|---|---|---|
| Drive | Sonic Boom mid flight | Blast radius of boom activates tiles | Aiming for the moon |
| Stinger | Electric ball trail | | Electric Shot! |
| Chip | Small Impact Bonus | Radius of rings activated on outfield impact | Rainmaker |
| Pitch | Impact Explosion | Radius++ of rings activated on outfield impact | |
| Putt | Golf clap | Putting Bonus | Drive for show, putt for dough<br>Tap in Master |
| Bunker | Sandcastle Explode | Bunker Bonus | Somebody went to the beach |

| Shot | End Position | Effect | Scoring | Superlative |
|---|---|---|---|---|
| Draw | | Call out | | |
| Fade | | Call out | | |
| Power Fade | | Power aura ball trail | | |
| Hook | | Call out | | |
| Slice | | Call out | | |
| Hole-In-One | Middle of target, no roll | Tile smash and AoE | Area of effect extra tiles | Hole-in-One! ACE! |
| Target-In-One | Lands in target, not center, no roll | Tile smash and AoE | Area of effect extra tiles | |
| Roll/Bounce into target | Lands near outfield - rolls/bounces into target | Skipping stone, rays from below | Area of effect extra tiles | |
| Wormburner | | Fire trail | Extra tiles activated by bounce and roll | |
| Shank | | Call out | | Air mail<br>Fore!<br>Whiff Wizard |
| Near miss | Left or Right of a target | Slow motion - Call out - "Aaaaaw" | | |

| Shot Type | Description | Key Flight Characteristics | Detectable? |
|---|---|---|---|
| Drive | The first shot on a hole, typically made from the tee box with a driver to cover as much distance as possible. | High launch angle, long carry distance, and typically low curve. | Yes |
| Approach | Usually the second shot on a hole with the goal of landing the ball on the green. | Medium launch angle, targeted distance (depending on hole distance), and minor curve (if aiming for a draw or fade). | Maybe |
| Tee Shot | Any shot taken from the tee box to start a new hole. | Depends on the club used, could vary from high launch and distance (driver) to lower launch and distance (iron or wood). | No* |
| Chip | A less powerful, short game shot where the ball spends more time on the ground than in the air. | Low launch angle, short carry distance, and the ball spends more time rolling on the ground. | Yes |
| Pitch | Similar to a chip but hit with a higher trajectory; the ball spends more time in the air than on the ground. | Higher launch angle than chip shot, short carry distance, and the ball spends more time in the air. | Yes |
| Putt | A precise shot performed on the green with a putter, aimed at getting the ball into the hole. | Very low launch angle (almost zero), very short carry distance, and ball spends almost all its time rolling. | Yes |
| Bunker (Sand) Shot | A shot hit from a sand bunker using a sand wedge to hit the sand behind the ball. | High launch angle, short distance, typically a lot of backspin. | Yes |
| Flop Shot | A high trajectory shot usually hit over a hazard or bunker, designed to stop quickly once it lands. | Very high launch angle, short distance, maximum height, and often high backspin. | Yes |
| Punch (Knockdown) Shot | A low trajectory shot designed to avoid wind or go under tree branches. | Very low launch angle, less carry distance than a normal shot with the same club. | Yes |

FIG. 12

*all shots are Tee Shots

300

| Shot Type | Description | Key Flight Characteristics | Detectable? |
|---|---|---|---|
| Wormburner | This is a shot that travels very low to the ground, almost as if it's "burning worms." | Extremely low launch angle, the ball skims along the ground. | Yes |
| Skull | A shot where the club hits the top half of the ball, causing it to shoot forward with a low trajectory. | Low launch angle, potentially high speed, ball is hit with the leading edge of the club. | Maybe |
| Shank | A dreaded type of shot where the ball is struck with the hosel (part of the club where the head and shaft connect), causing it to veer off at a sharp angle. | Ball flies sharply to the right (for right-handed golfers), as it's struck with the hosel of the club. | Yes |
| Duff | A poorly hit shot where the golfer hits the ground before the ball, often causing the ball to travel a much shorter distance than intended. | Very short carry distance, club hits ground before the ball. | Maybe |
| Chunk | A shot occurs when the club hits the ground before the ball, causing the ball to come up short of the target. | Very short carry distance, club digs into turf before striking ball. | No |
| Thin (or Bladed) Shot | This shot happens when the ball is hit with the bottom edge or "blade" of the club. | Low launch angle, ball is struck with the bottom edge of the clubface. | No |
| Fat Shot | When the club hits the ground before making contact with the ball. | Very short carry distance, club hits ground well before the ball. | No |
| Pop Shot | This shot occurs when the club strikes the ball too high, causing it to pop up into the air and not travel very far. | Extremely high launch angle but short carry distance, ball is struck too high on the clubface. | Yes |

FIG. 14

REACTIVE GAME PLAY

CROSS REFERENCES TO RELATED APPLICATIONS

The Present Application is a continuation application of U.S. patent application Ser. No. 18/935,203, filed on Nov. 1, 2024, which claims priority to U.S. Patent Application No. 63/603,022, filed on Nov. 27, 2023, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to games utilizing physical and virtual elements.

Description of the Related Art

To score points in current TOPGOLF games, players are required to drive a golf ball from their bay and hit either a real-world target or a virtual target provided by the game. This causes problems for some players who cannot hit those targets. When this occurs, the player doesn't scores any points and is unable to compete with others in their bay who can hit the targets. This results in a negative experience for the player, which should be resolved.

At the present time, the current TOPGOLF games only allow one difficulty level for the whole bay. When groups of mixed skillsets arrive to play, this can mean that there's disparity between how difficult a player finds the game, with some finding it too easy while others find it too hard. In turn, this creates frustration among players, resulting in a negative experience.

Outside of tracer stats, TOPGOLF games currently do not detect the type of shot a player hits and do not provide shot-type-related feedback to the player. A more positive experience for the player can be created by detecting their types of shots and using that data to provide reactions and feedback in-game.

BRIEF SUMMARY OF THE INVENTION

The solution should ensure players who are unable to hit their golf ball into a target in the outfield can still obtain points and feel like they can still compete with other players.

The present invention detects the type of golf shot the player has hit and provides feedback to the player in a way that creates an overall more positive experience. Implementing a system that detects shots will allow the games to: give enhanced feedback—provide players with immediate feedback on swing mechanics to understand what they're doing right/wrong; track progress of different shot types; tailor the game to the player by modifying gameplay based on shot types detected; and boost confidence by celebrating shot types in different ways.

The present invention provides the following benefits: greater inclusivity; a sense of fairness among groups of mixed skill level; enhanced social experience—groups with mixed skill levels can enjoy playing together with less embarrassment for lower skilled players or feeling like players of higher skill have an advantage; overall retention—if players feel like they were able to contribute/compete they are more likely to return; and improvements to the venue's reputation as a place where players of all skill level can have fun.

One aspect of the present invention is a system for playing a player reactive game at a golf entertainment venue. The system includes golf ball tracking sensors, hitting bays and a server. The golf ball tracking sensors are positioned at a golf driving range. The hitting bays are also at the golf driving range, and each hitting bay has a video display. The server is in communication with each of the golf ball tracking sensors and each video display. Thee server is configured to detect a type of golf shot the player has hit. The server is configured to transmit feedback to the player in a way that creates an overall more positive experience. The server is configured to track a progress of different shot types. The server is configured to modify gameplay based on the shot types detected. The server is configured to celebrate shot types in different ways.

The player reactive game preferably comprises a plurality of tiles covering an entire virtual outfield of the golf driving range. A golf ball hit by a player at a hitting bay while playing the game is tracked by at least a pair of the golf ball tracking sensors and the player is awarded with points for virtually hitting tiles.

Another aspect of the present invention is a method playing a player reactive game at a golf entertainment venue. The method includes generating a game on a video display in a hitting bay of a plurality of hitting bays of a golf driving range, wherein the game comprises a plurality of tiles covering an entire virtual outfield of the golf driving range. The method also includes hitting, by a player, a plurality of shots of golf balls toward the outfield of the golf driving range from the hitting bay of the plurality of hitting bays of the golf driving range. The method also includes tracking a flight of each shot of golf balls using a plurality of golf ball tracking sensors positioned at a golf driving range. The method also includes detecting a type of golf shot the player has hit. The method also includes transmitting feedback to the player in a way that creates an overall more positive experience. The method also includes tracking a player progress of different shot types. The method also includes modifying gameplay based on the shot types detected. The method also includes celebrating shot types in different ways.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 10 is a table of shot types.

FIG. 11B is a continuation of the table of FIG. 11A.

FIG. 12 is a table of formal shot types.

FIG. 14 is a table of informal shot types.

DETAILED DESCRIPTION OF THE INVENTION

Figure 1:
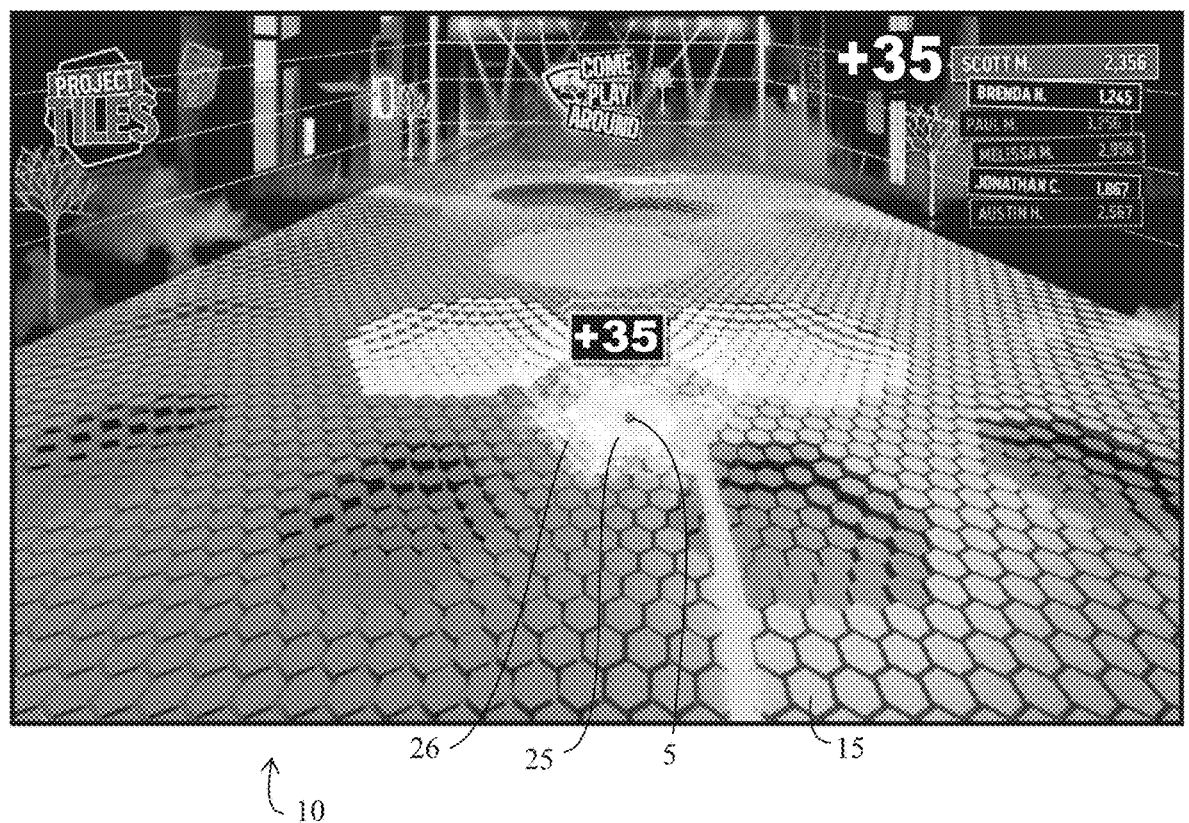
FIG. 1 is screen shot of the virtual display of the golf range when playing the game.

At a golf entertainment venue, a player or group of players are assigned a hitting bay. The hitting bay has various screens and graphical user interfaces for inputting player information and selecting a game to play. The hitting bay also has a golf ball dispenser with a screen such as disclosed in Burdette et al., U.S. Patent Publication Number 20220203178 (U.S. patent application Ser. No. 17/699,020 filed on Mar. 18, 2022) for a Golf Ball Dispenser With Embedded Display Device, Separate Front Waterfall Panel And/Or Blower Assembly, which is hereby incorporated by reference in its entirety. When a game with a reactive function is selected by a player, the game begins to track the players performance for each shot. This involves obtaining golf ball tracking data and utilizing a game engine with a virtual game. The golf ball tracking data is combined with the virtual game data to generate an output displayed on the various screens in the hitting bay and on devices. When a ball is hit, a camera system tracks the ball flights and produces a trace data for the struck golf ball. Such a system is disclosed in Hugmark et al., U.S. patent Ser. No. 12/121,771 for a Trajectory Extrapolation And Origin Determination For Objects Tracked in Flight, which is hereby incorporated by reference in its entirety. The virtual environment for a game is provided for combining the data with the golf ball tracking data. One such mechanism for providing data to generate a virtual environment for a driving range of a golf entertainment venue is disclosed in Medcalf, U.S. patent application Ser. No. 18/751,522, filed on Jun. 24, 2024, for Data Generated Outfields, is hereby incorporated by reference in its entirety. Generating a virtual image of a driving range of golf entertainment venue is also disclosed in Cheng et al., U.S. Pat. No. 7,847,808 for Photographic Mapping In A Simulation, which is hereby incorporated by reference in its entirety. Thus the playing field for a game is constructed in in a virtual environment creating a virtual driving range that matches the X-Y coordinates of the physical driving range. Further, use of virtual golf equipment is disclosed in Cheng, U.S. Pat. No. 7,806,777 for Automatically Adapting Virtual Equipment Model, which is hereby incorporated by reference in its entirety. Further, the bounce and the roll of a golf ball in a virtual environment is disclosed in Medcalf, U.S. patent application Ser. No. 18/750,251, filed on Jun. 21, 2024, for a Bounce & Roll Engine, is hereby incorporated by reference in its entirety.

The shot type are detected by the camera system at a venue. Detecting shot types has four separate factors: determining what shot types should be detected; gathering the shot characteristics (launch vector, curve amount, ball speed, etc.) that make up the shot types determined; developing a system that compares the determined shot types with the player's shot and informing the game; and reacting to the detected shot type in-game.

Figure 6:
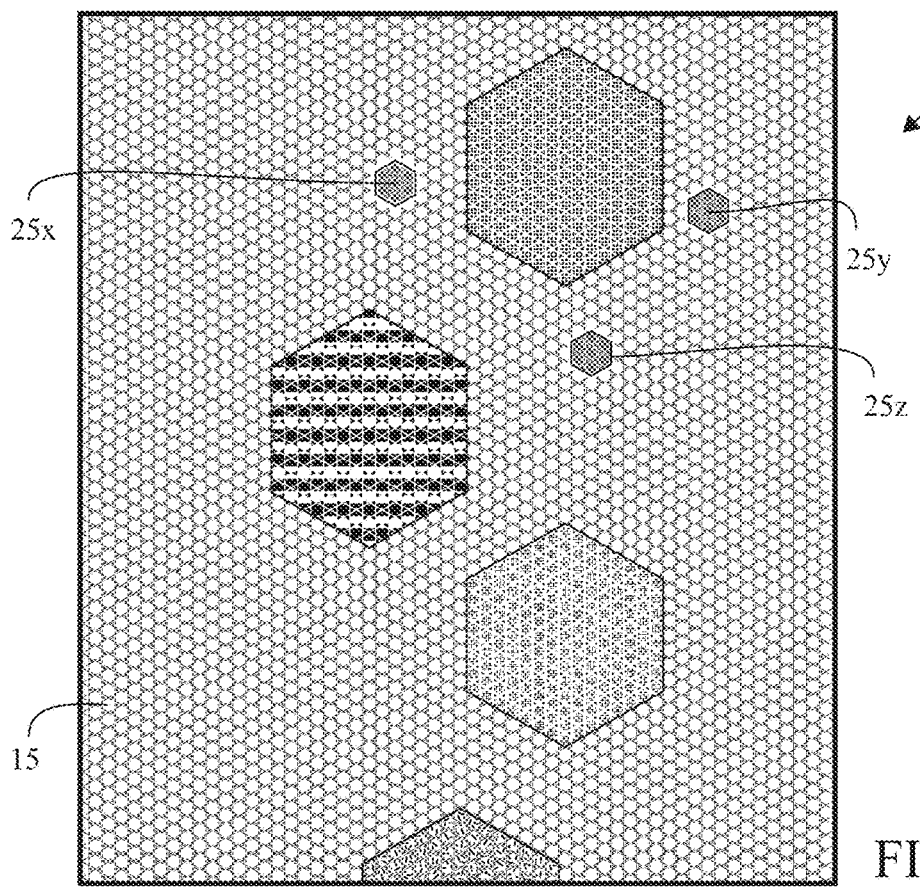
FIG. 6 is an illustration of an isolated portion of the virtual display of the golf range when playing the game.

In a preferred embodiment of a reactive game, tiles are created in the virtual driving range with each tile matching a location of the physical driving range. The trace data from the camera sensors direct the flight of a golf ball in the virtual environment of the reactive game. The bounce and roll engine assist with the bounce and roll in the virtual environment. Based on the trace data (matching the actual flight of the struck golf ball from the hitting bay to the driving range), tiles are "hit" in the virtual environment. As play progresses, bonus tiles 25, shown in FIGS. 6-8, appear in the outfield 10, glowing and highlighted so that the player knows something great will happen if the player hits one.

Hitting a bonus tile 25 activates surrounding tiles and awards the player with extra points.

Figure 7:
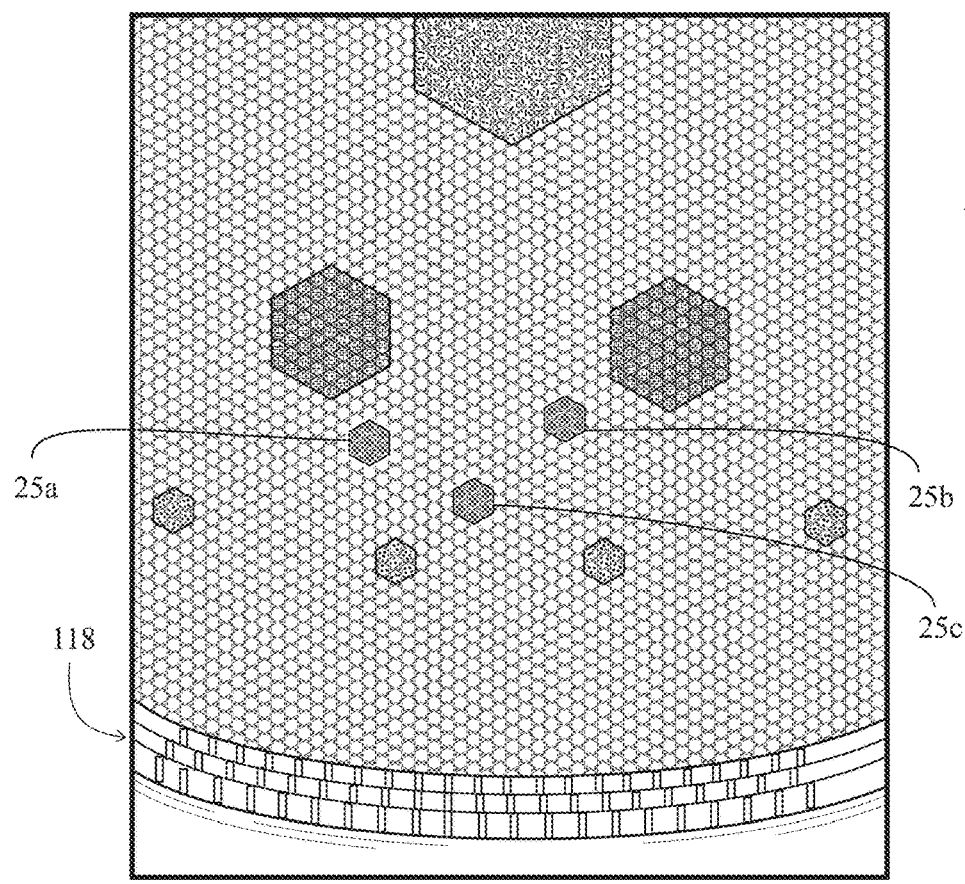
FIG. 7 is an illustration of an isolated portion of the virtual display of the golf range when playing the game.

The placement of bonus tiles 25 adjusts to how the player has been hitting their shots. To achieve this, the player's shot history during the game is used to determine the placement of bonus tiles 25. This means that the more skilled golfers who are hitting the ball further down the outfield 10 will have more difficult bonus tiles 25 to hit. Players hitting the ball closer to the hitting bays 118 will get much easier bonus tiles to hit, making it easier for them to score points. FIG. 7 shows a short shot player's bonus tile 25a-25c placement versus a long shot player's bonus tile 25x-25z placement in FIG. 6.

The bespoke software component (BSC) determines where the golf ball has impacted the outfield and awards points, whether the ball hits a target or not.

This will allow for the following benefits to the game: allows scoring for a wider range of skill levels; variety—not always having to aim for the regular targets; different golf strategies—players have more opportunities to either play it safe or take bigger risks, utilizing the entire outfield for scoring.

Covering the outfield in hexagonal tiles allows for giving the player points based on where the ball lands and rolls with the need to hit a target. However, each tile can alternatively be a square, circle, diamond, triangle, rectangle or polygon.

Each tile is preferably the same size. Each tile has a representative width ranging from 0.1 meter to 10 meters in the virtual outfield.

On game load, the data for the current venue in which the game is being played is pulled into the game and the regular outfield 10 is generated from it.

Figure 3:
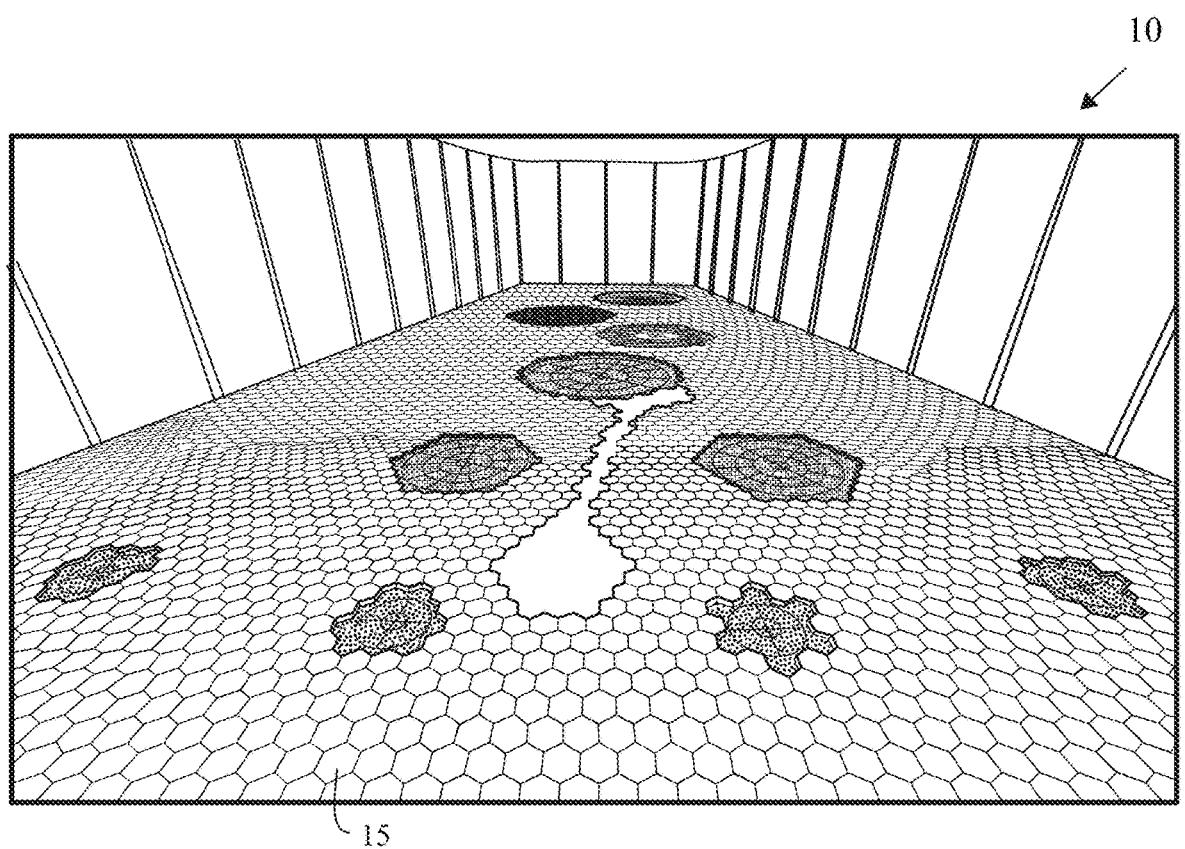
FIG. 3 is an illustration of the virtual display of the golf range when playing the game.
Figure 4:
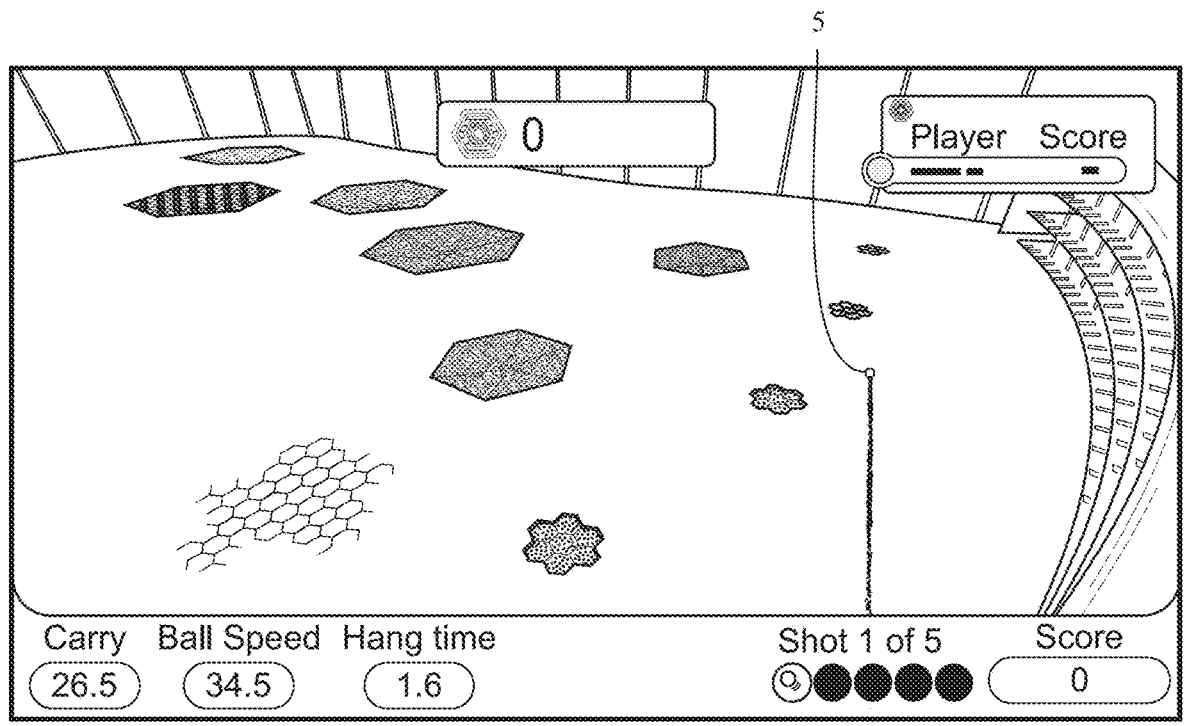
FIG. 4 is an illustration of the virtual display of the golf range when playing the game.
Figure 5:
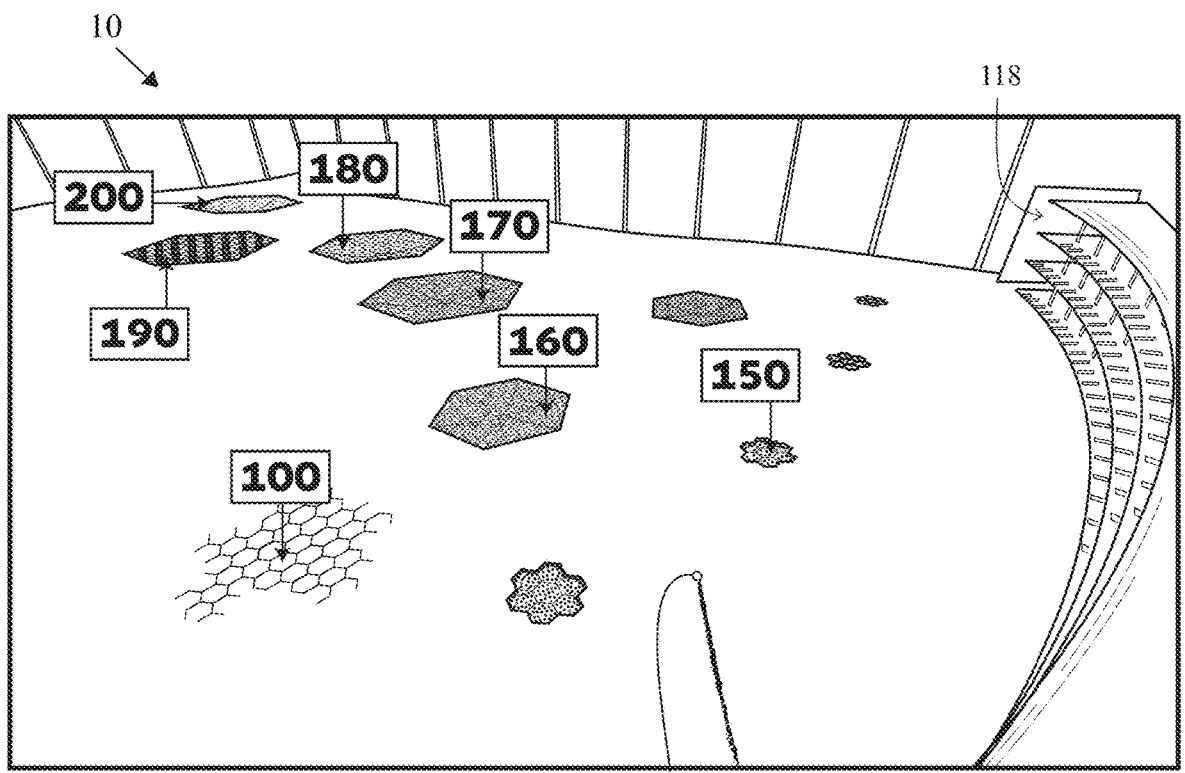
FIG. 5 is an illustration of the virtual display of the golf range when playing the game.
Figure 8:
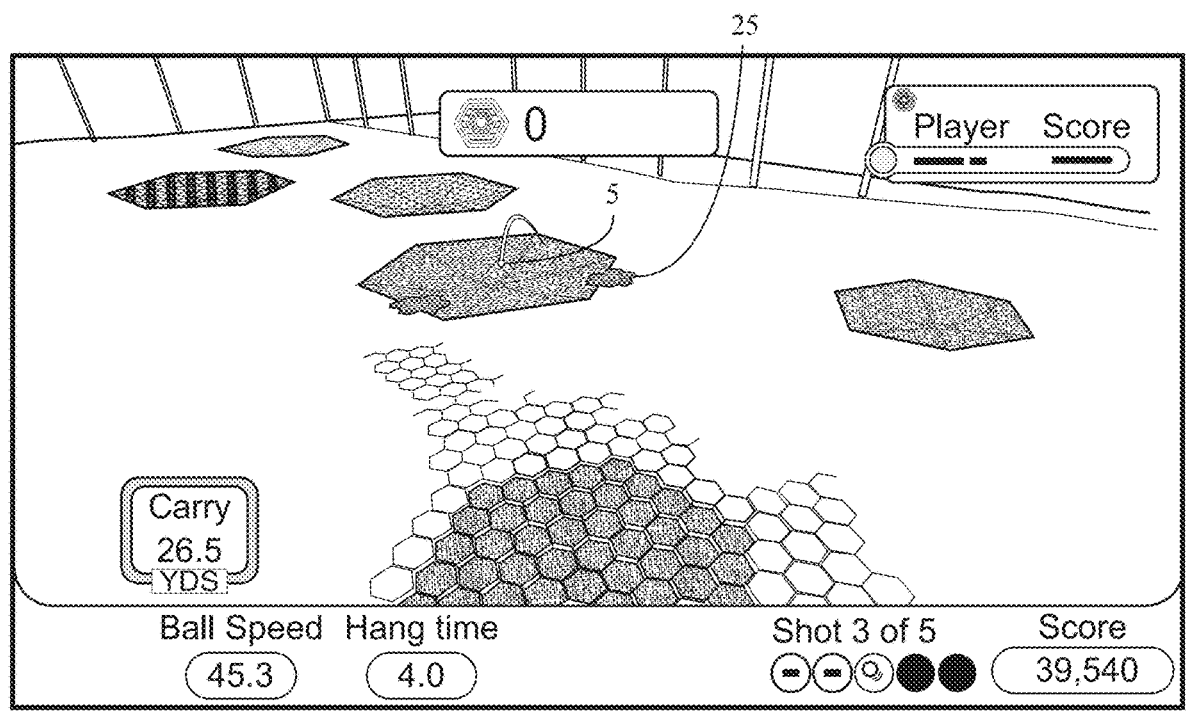
FIG. 8 is an illustration of the virtual display of the golf range when playing the game.

The BSC then creates a grid of hexagonal tiles 15, overlaying them on the generated outfield. A tile-covered outfield 10 can be seen in FIGS. 1-3. In FIGS. 4-5 and FIG. 8 the outfield have the same tile layout, however, only a patch of tiles is shown as an example.

Preferably, the number of tiles the grid is comprised of is between 1,000 to 50,000 tiles. More preferably, the number of tiles the grid is comprised of is between 10,000 to 20,000 tiles.

A player's golf ball 5 is tracked by sensors and when the players golf ball 5 impacts with the outfield 10, the BSC checks the impact position and finds the nearest tile in the grid created. Then that tile is activated and points are awarded to the player for virtually hitting that tile.

The BSC allows for custom point values to be assigned to a tile to award more/less points depending on where the ball lands.

Figure 9:
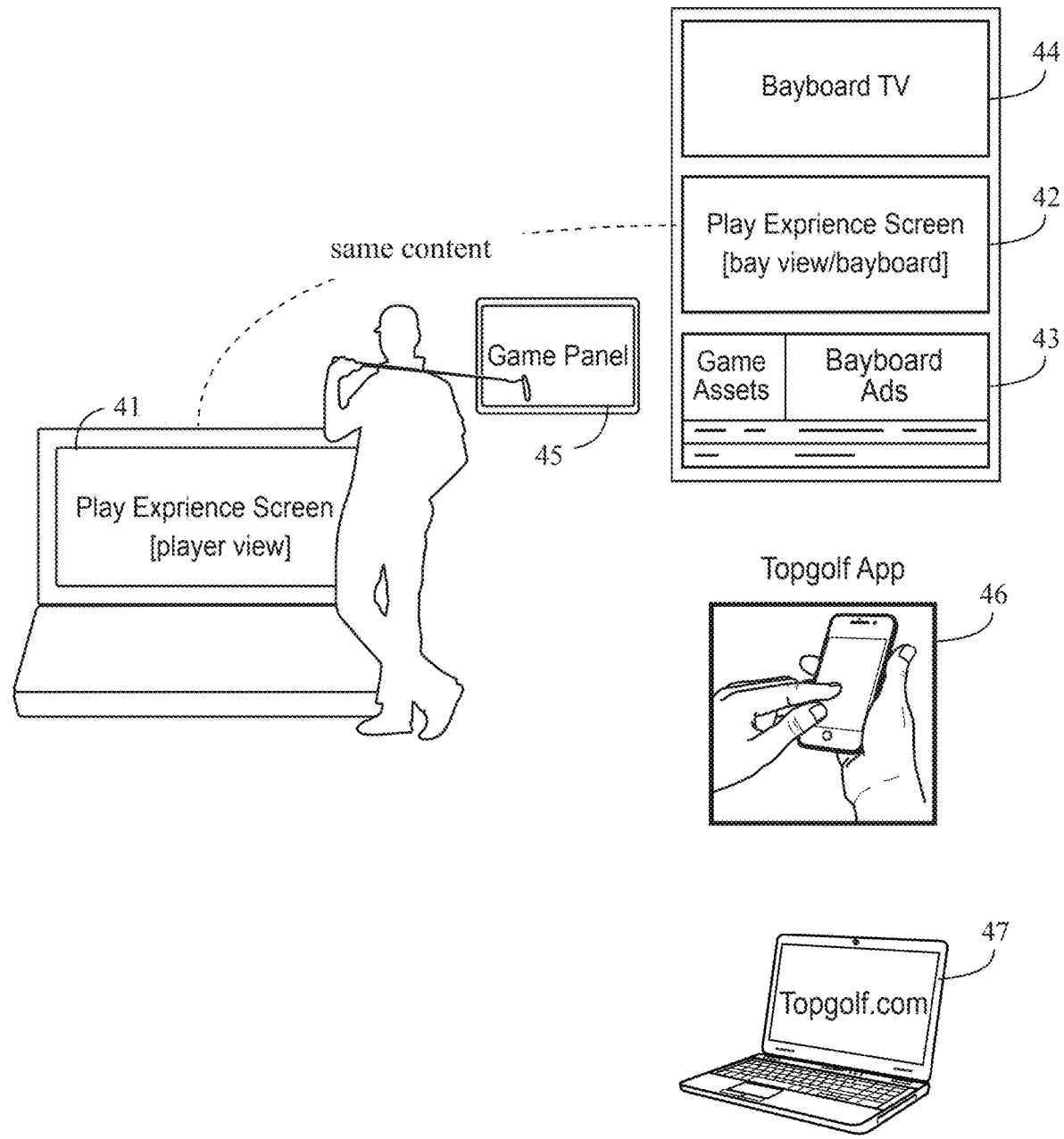
FIG. 9 is an illustration of player interfaces and venue screens.

FIG. 9 is an illustration of the different player interfaces and venue screens. The play experience screens show the same content in the hitting bay. The player view screen 41 is front of the player as the player addresses the golf ball. The game panel 45 allows the player to make adjusts to the player order and to input additional information. The bay view screen 42 displays the same content as the player view screen. A bayboard TV 44 provides additional content to the players in the hitting bay, and bayboard ads 43 displays various advertising content to the players in the hitting bay. The game can be also viewed through a mobile app 46 or through a website 47 of the venue.

FIG. 10 is a table 100 of shot types and their details relating to the game. The shot types are: drive, stinger, chip, pitch, putt, and bunker. The top table data is mainly used for determining the shot type. The Effect, Scoring and Superlatives are reactions to the shot type and used in-game to award and celebrate the shots and to make game playing more positive.

An example of a shot type and the resulting details is shown in FIG. 1. A player hit a ball 5 onto a bonus tile 25. From the shot characteristics gathered by the system, it was determined that it was a pitch shot. For the pitch shot, in the bottom table 100, the Effect is an impact explosion and the Scoring is a radius ++ of rings activated on outfield impact 26.

Figure 2:
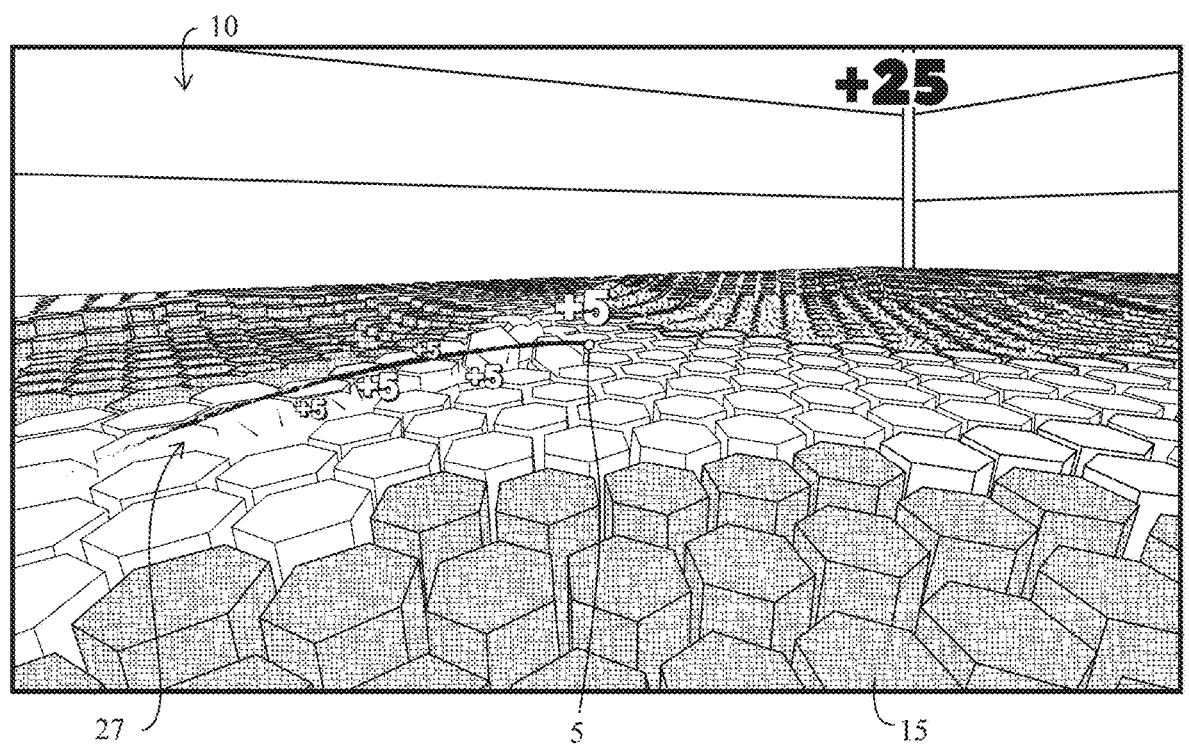
FIG. 2 is an illustration of an isolated portion of the virtual display of the golf range when playing the game.
Figure 11A:
FIG. 11A is a continuation of the table of FIG. 10.

FIG. 11A is a continuation of the table 100 of shot types and their details. The shot types here are draw, fade, power fade, hook, slice, hole-in-one, target-in-one, roll/bounce into target, wormburner, shank and near miss. FIG. 11B is a continuation of the details of the shot types in FIG. 11A. For the roll/bounce shot the skipping stone and rays from below 27 are shown in FIG. 2. The extra tiles were 5 points each, thereby awarding a bonus of 25 total points.

Figure 13:
FIG. 13 is a continuation of the table of FIG. 12.

FIGS. 12-13 show a table 200 of formal shots describing their characteristics and their detectability. The formal shots are: drive; approach; tee shot (all shots are considered tee shots); chip; pitch; putt; bunker (sand) shot; flop shot; and punch (knockdown) shot; draw; fade; hook; slice; layup shot; recovery/escape shot; pitch-and-run; and a hole-in-one.

Figure 15:
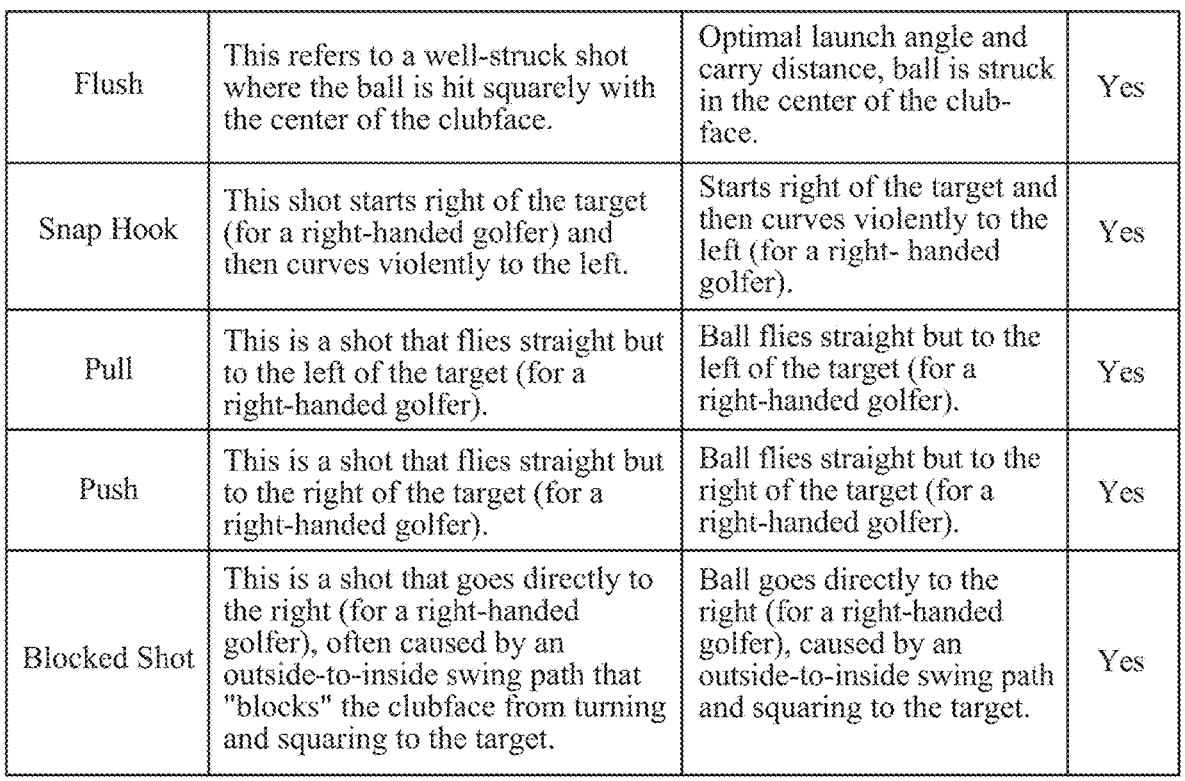
FIG. 15 is a continuation of the table of FIG. 14.

FIGS. 14-15 show a table 300 of informal shots describing their characteristics and their detectability. The unformal shots are wormburner; skull; shank; duff; chunk; thin/bladed shot; fat shot; pop shot; flush; snap hook; pull; push; and blocked shot.

Figure 16:
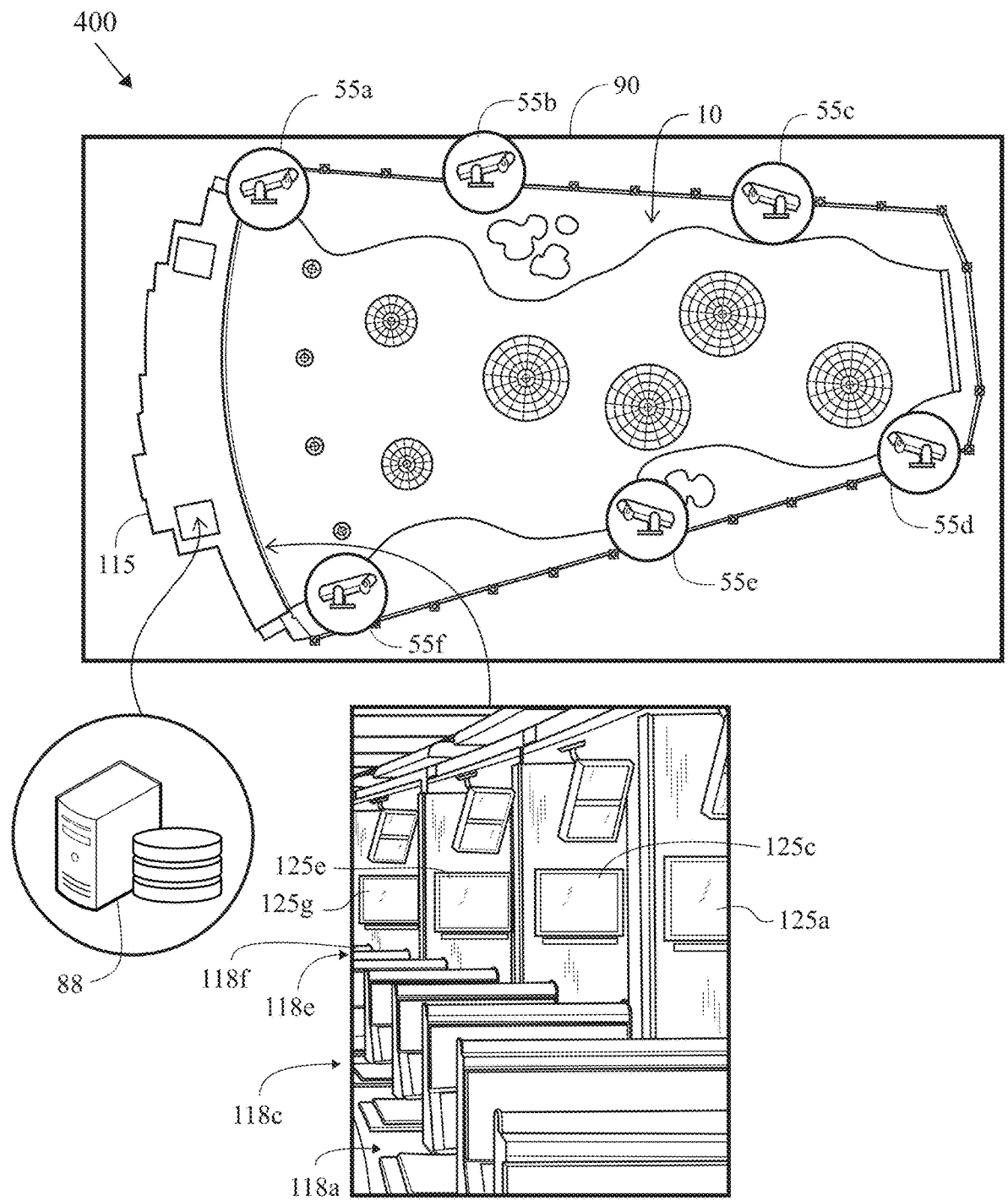
FIG. 16 is an illustration of a system for playing a player reactive game at a golf entertainment venue.

A system 400 for playing a player reactive game at a golf entertainment venue 90 is shown in FIG. 16. The system includes golf ball tracking sensors 55a-55f positioned at the driving range, hitting bays 118 with a video display 125 in each bay 118, and a server 88. The server 88 communicates with each of the golf ball tracking sensors 55a-55f and with each video display 125a-125e of the hitting bays 118a-118f. The server 88 detects the type of golf shot the player hit and tracks the progress of different shot types. The server 88 modifies the gameplay based on the shot types detected, and then celebrates the shot types in different ways.

The server 88 transmits feedback, such as effects of the shot type, to the player in a way that creates an overall more positive experience. The server 88 also generates bonus tiles corresponding to the tile previously virtually hit, and awards points if a bonus tile is hit.

The golf ball tracking sensors 55 are preferably camera sensors. Alternatively, they can be radar sensors.

Figure 17:
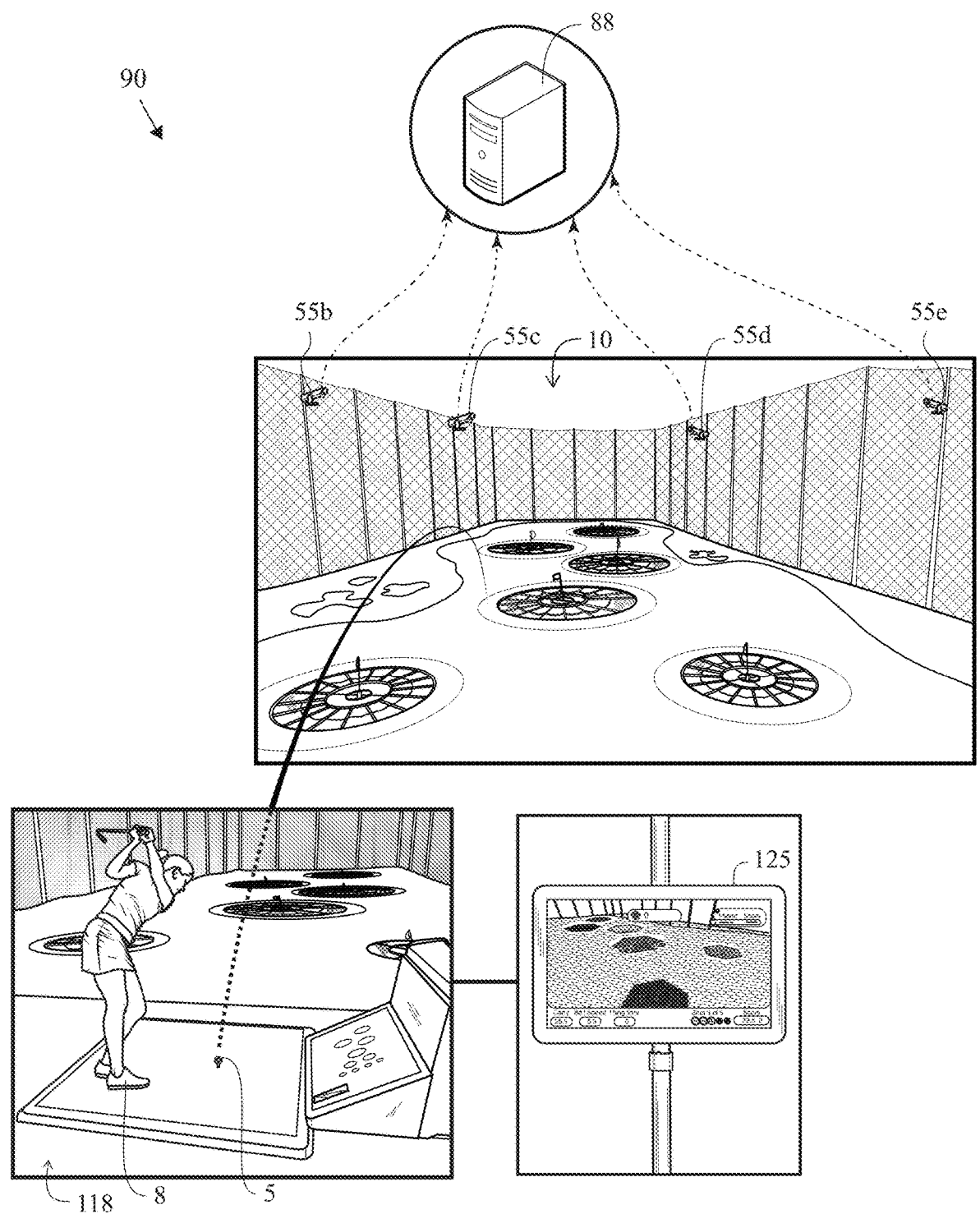
FIG. 17 is an illustration of a golf entertainment venue.

A golf entertainment venue 90 is shown in FIG. 17. In reference to FIG. 16, the hitting bays 118 are in the building 115 portion of the venue 90, facing the outfield 10. Within each hitting bay 118, there is a video display 125 from which a player plays the game. A ball 5 hit by a player 8 while playing the game is tracked by golf ball tracking sensors 55. Preferably, at least two or more sensors. The player 8 is awarded with points for hitting virtual tiles, shown on the display 125.

Figure 18:
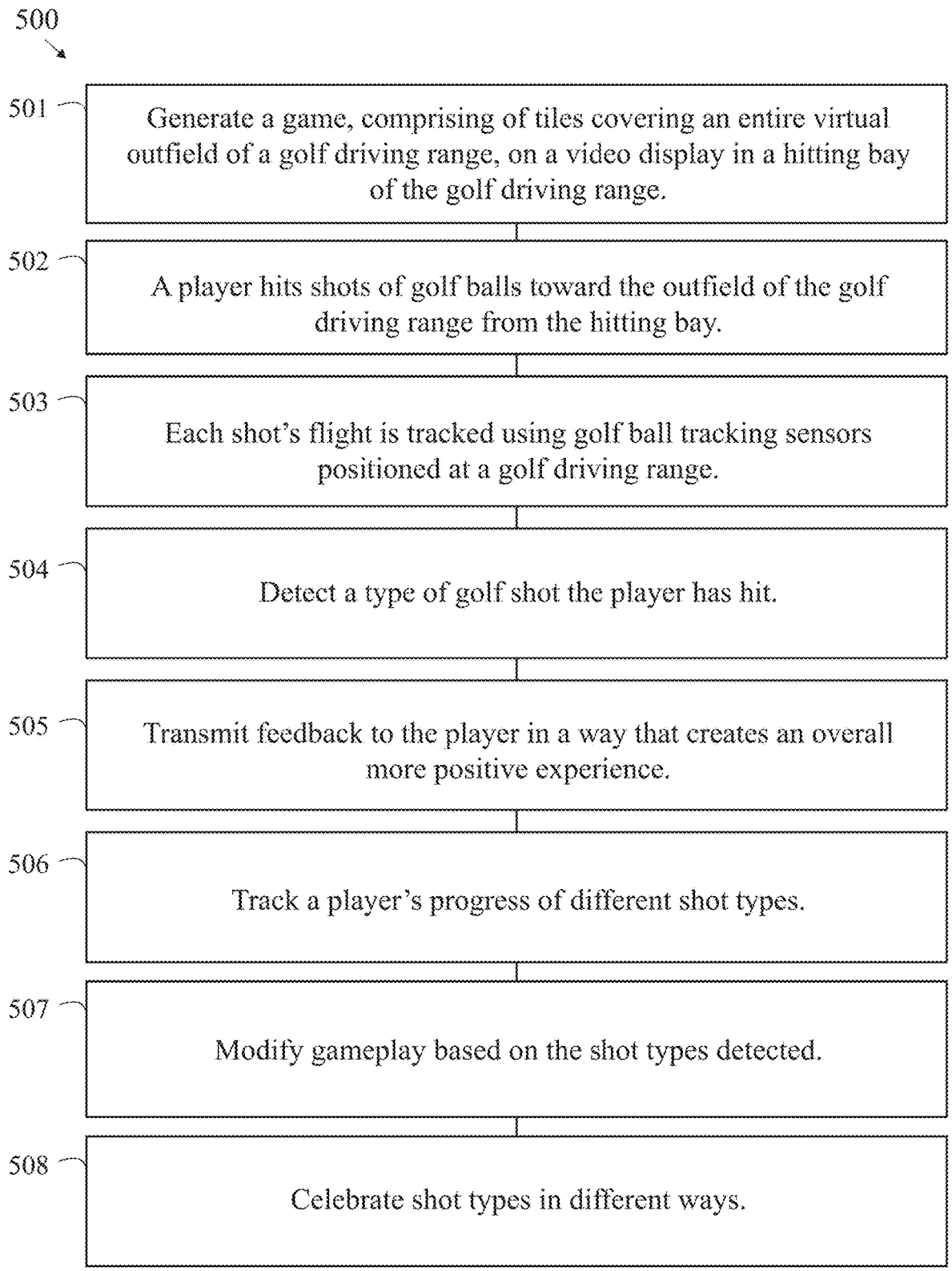
FIG. 18 is a flow chart for a method for playing a player reactive game at a golf entertainment venue.

A flow chart 500 for a method for playing a player reactive game at a golf entertainment venue is shown in FIG. 18. In step 501, a game, created by tiles covering an entire virtual outfield of the golf driving range, is generated on a video display in a hitting bay. A player, from the hitting bay, hits shots of golf balls toward the outfield of the driving range in step 502. The flight of each golf ball shot is tracked by the tracking sensors in step 503. The type of golf shot hit by the player is detected in step 504. In step 505, feedback is transmitted to the player in a way that creates an overall more positive experience. In step 506, player progress of different shot types is tracked. In step 507, the gameplay is modified based on the shot types detected. Step 508 is celebrating the shot types in different ways.

Thirkettle et al., U.S. Pat. No. 7,056,221 for a Ball Collection Arrangement, is hereby incorporated by reference in its entirety.

Golliffe et al., U.S. Pat. No. 7,059,974 for Golf Balls With Impact Resistant Identification Device, is hereby incorporated by reference in its entirety.

Thirkettle et al., U.S. Pat. No. 7,160,196 for an Identification Device, is hereby incorporated by reference in its entirety.

Thirkettle et al., U.S. Pat. No. 7,337,965 for a Ball Identifying Device, is hereby incorporated by reference in its entirety.

Savarese et al., U.S. Pat. No. 7,691,009 for Apparatus And Methods Relating To Findable Balls, is hereby incorporated by reference in its entirety.

Savarese et al., U.S. Pat. No. 7,766,766 for Methods And Apparatus Relating To Findable Balls, is hereby incorporated by reference in its entirety.

Cheng, U.S. Pat. No. 7,806,777 for Automatically Adapting Virtual Equipment Model, is hereby incorporated by reference in its entirety.

Cheng, U.S. Pat. No. 7,847,808 for Photographic Mapping In A Simulation, is hereby incorporated by reference in its entirety.

Savarese et al., U.S. Pat. No. 8,002,645 for Apparatus, Methods And Systems Relating To Findable Balls, is hereby incorporated by reference in its entirety.

Cheng, U.S. Pat. No. 8,029,359 for Providing Offers To Computer Game Players, is hereby incorporated by reference in its entirety.

Forsgren, U.S. Pat. No. 8,077,917 for Systems And Methods For Enhancing Images in A Video Recording of A Sports Event, is hereby incorporated by reference in its entirety.

Caster et al., U.S. Pat. No. 9,132,326 for a System For Providing Loaner Clubs To Novice Golfers, is hereby incorporated by reference in its entirety.

Forsgren, U.S. patent Ser. No. 10/596,416 for a System And Method For Three Dimensional Object Tracking Using Combination of Radar And Image Data, is hereby incorporated by reference in its entirety.

Semsak et al., U.S. patent Ser. No. 10/799,770 for a RFID Golf Ball Testing Apparatus, is hereby incorporated by reference in its entirety.

Johanssson et al., U.S. patent Ser. No. 10/898,757 for Three Dimensional Object Tracking Using Combination of Radar Speed Data And Two Dimensional Image Data, is hereby incorporated by reference in its entirety.

Forsgren et al., U.S. patent Ser. No. 11/335,013 for Three Motion Based Pre-Processing Of Two-Dimensional Image Data Prior To Three-Dimensional Object Tracking With Virtual Time Synchronization, is hereby incorporated by reference in its entirety.

Levin, U.S. patent Ser. No. 11/409,411 for a Single Finger User Interface Camera Control, is hereby incorporated by reference in its entirety.

Johansson et al., U.S. patent Ser. No. 11/504,582 for Three Dimensional Object Tracking Using Combination of Radar Speed Data And Two Dimensional Image Data, is hereby incorporated by reference in its entirety.

Stroud, U.S. patent Ser. No. 11/779,809, for a Method And System Utilizing A Golf Shot API Proxy, is hereby incorporated by reference in its entirety.

Burdette, U.S. patent application Ser. No. 18/202,178, filed on May 25, 2023, for a Golf Ball Identification Apparatus And System, is hereby incorporated by reference in its entirety.

Burdette et al., U.S. Patent Publication Number 20220203178, for a Golf Ball Dispenser With Embedded Display Device, Separate Front waterfall And/Or Blower Assembly, is hereby incorporated by reference in its entirety.

Ekstrom et al., U.S. patent Ser. No. 11/786,783 for Identifying A Location For A Striker Of An Object, is hereby incorporated by reference in its entirety.

Eriksson et al., U.S. patent Ser. No. 11/815,618 for Doppler Radar Coexistence, is hereby incorporated by reference in its entirety.

Wase, U.S. patent Ser. No. 11/934,085 for a Camera Mounting Post, is hereby incorporated by reference in its entirety.

Burdette et al., U.S. patent Ser. No. 11/944,883, for a Galton Configuration In Golf Ball Receiving Apparatus And Systems, is hereby incorporated by reference in its entirety.

Forsgren et al, U.S. patent Ser. No. 11/995,846 for Three Dimensional Object Tracking Using Unverified Detections Registered By One Or More Sensors, is hereby incorporated by reference in its entirety.

Medcalf, U.S. patent application Ser. No. 18/750,683, filed on Jun. 21, 2024, for a RFID And Trace Pairing, is hereby incorporated by reference in its entirety.

Medcalf, U.S. patent application Ser. No. 18/751,522, filed on Jun. 24, 2024, for Data Generated Outfields, is hereby incorporated by reference in its entirety.

Medcalf, U.S. patent application Ser. No. 18/750,251, filed on Jun. 21, 2024, for a Bounce & Roll Engine, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A system for playing a player reactive game at a golf entertainment venue, the system comprising:
   a plurality of golf ball tracking sensors positioned at a golf driving range;
   a plurality of hitting bays at the golf driving range, each of the plurality of hitting bays having a video display; and
   a server in communication with each of the plurality of golf ball tracking sensors and each video display of the plurality of hitting bays;
   wherein the server is configured to generate a virtual game on the video display, wherein the game comprises a plurality of tiles covering an entire virtual outfield of the golf driving range;
   wherein the server is configured to detect golf ball hit by a player at a hitting bay while playing the game
   wherein the server is configured to generate a flight and landing of the golf ball based on tracking by the plurality of golf ball tracking sensors;
   wherein the server is configured to display the flight and landing of the golf ball on the virtual outfield of the golf driving range; and
   wherein the server is configured to award the player with at least one point for virtually hitting a tile of the plurality of tiles.

2. The system according to claim 1 wherein the server is configured to determine a type of golf shot by the player.

3. The system according to claim 1 wherein the server is configured to generate a plurality of bonus tiles for a subsequent hit corresponding to the tile previously virtually hit by the player.

4. The system according to claim 1 wherein the plurality of tiles comprises from 10,000 to 20,000 tiles.

5. The system according to claim 3 wherein the serve is configured to award the player with extra points if a bonus tile is hit in the virtual game.

6. The system according to claim 1 wherein each of the plurality of golf ball tracking sensors is a camera sensor.

7. The system according to claim 1 wherein each of the plurality of golf ball tracking sensors is a radar sensor.

8. The system according to claim 1 wherein each tile is a hexagon, square, circle, diamond, triangle, rectangle or polygon.

9. The system according to claim 1 wherein each of the tiles is the same size.

10. The system according to claim 1 wherein each tile has a representative width ranging from 0.1 meter to 10 meters in the virtual outfield.

11. A method for playing a player reactive game at a golf entertainment venue, the method comprising:
   generating a game on a video display in a hitting bay of a plurality of hitting bays of a golf driving range, wherein the game comprises a plurality of tiles covering an entire virtual outfield of the golf driving range;
   hitting, by a player, a plurality of shots of golf balls toward the outfield of the golf driving range from the hitting bay of the plurality of hitting bays of the golf driving range;
   tracking a flight of each shot of golf balls using a plurality of golf ball tracking sensors positioned at a golf driving range;
   communicating the data for the tracking of the golf ball from the plurality of golf ball tracking sensors to the server;
   generating a bounce and roll prediction at the server for the tracked golf ball;

combining, at the server, a trace of the flight of the golf ball and the bounce and roll of the golf ball to generate a complete shot of the golf ball in the game;

displaying, on a video display in the hitting bay, the full shot of the golf ball in the virtual outfield of the game; and awarding points to the player for tiles of the plurality tiles impacted by the full shot of the golf ball in the virtual outfield of the game;

wherein the game comprises a plurality of tiles covering an entire virtual outfield of the golf driving range, wherein a golf ball hit by a player at a hitting bay while playing the game is tracked by at least a pair of the plurality of golf ball tracking sensors and the player is awarded with points for virtually hitting tiles of the plurality of tiles, and the method further comprises generating a bounce and roll prediction at the server for the tracked golf ball; and combining, at the server, a trace of the flight of the golf ball and the bounce and roll of the golf ball to generate a complete shot of the golf ball in the game.

12. The method according to claim 11 further comprising determining the type of golf shot hit by the player.

13. The method according to claim 11 wherein the plurality of tiles comprises from 1000 to 50,000 tiles.

14. The method according to claim 11 wherein the plurality of tiles comprises from 10,000 to 20,000 tiles.

15. The method according to claim 11 wherein each tile is each tile is a hexagon.

16. The method according to claim 11 wherein each of the plurality of golf ball tracking sensors is a camera sensor.

17. The method according to claim 11 wherein each of the plurality of golf ball tracking sensors is a radar sensor.

18. The method according to claim 11 wherein each tile is a square, circle, diamond, triangle, rectangle or polygon.

19. The method according to claim 11 wherein each of the tiles is the same size.

20. The method according to claim 11 wherein each tile has a representative width ranging from 0.1 meter to 10 meters in the virtual outfield.

* * * * *